No. 889,090. PATENTED MAY 26, 1908.
E. C. BANDLE.
CLOD CRUSHER.
APPLICATION FILED SEPT. 19, 1907.
2 SHEETS—SHEET 1.
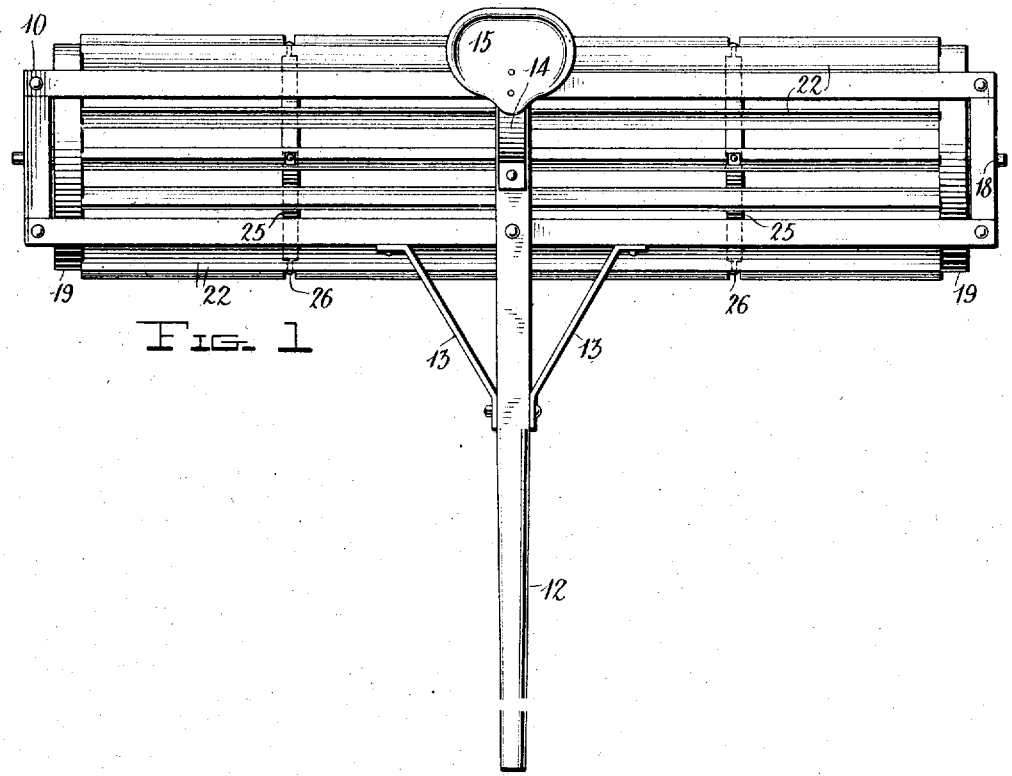
Fig. 1
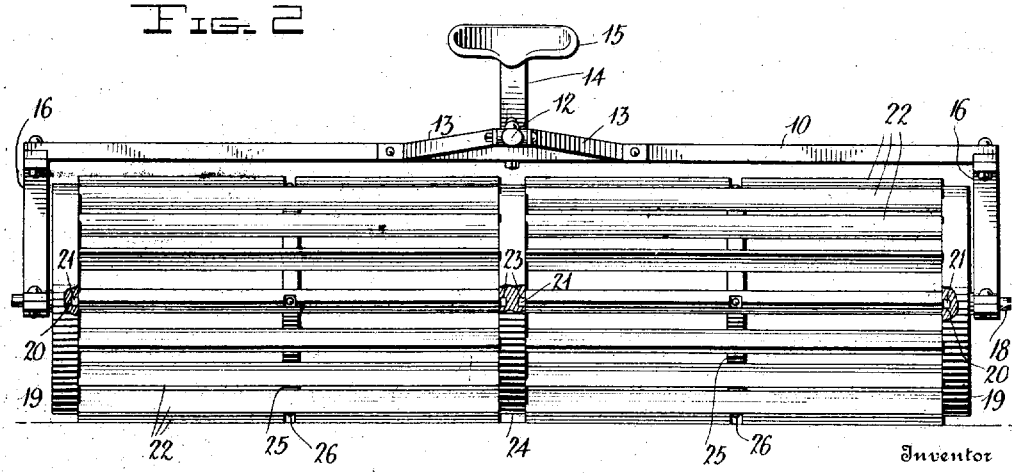
Fig. 2
Witnesses
Inventor
Ernest C. Bandle
By 
Attorney No. 889,090. PATENTED MAY 26, 1908.
E. C. BANDLE.
CLOD CRUSHER.
APPLICATION FILED SEPT. 19, 1907.
2 SHEETS—SHEET 2.
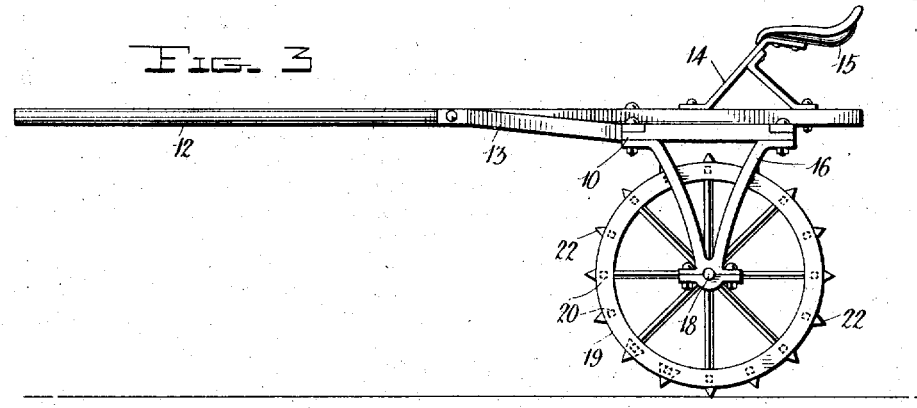
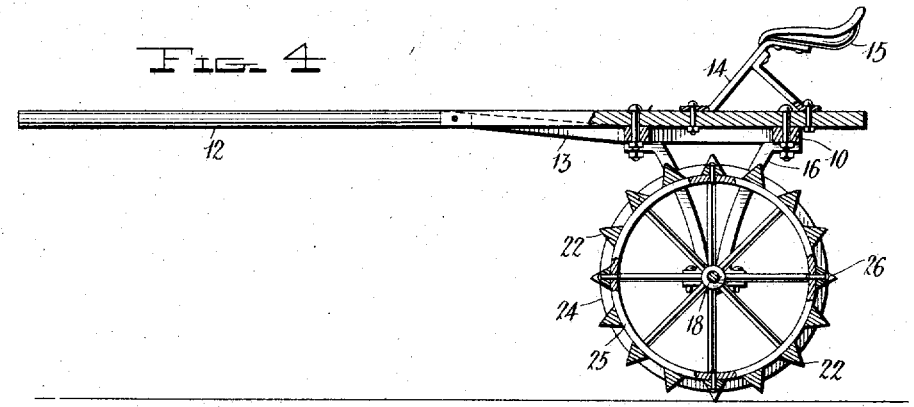
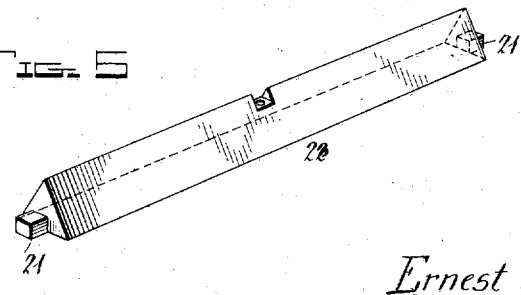
Witnesses
Inventor
Ernest C. Bandle
By 
Attorney

UNITED STATES PATENT OFFICE.

ERNEST C. BANDLE, OF LEWISTOWN, ILLINOIS.

CLOD-CRUSHER.

No. 889,090. Specification of Letters Patent. Patented May 26, 1908.

Application filed September 19, 1907. Serial No. 393,707.

*To all whom it may concern:*

Be it known that I, ERNEST C. BANDLE, a citizen of the United States, residing at Lewistown, in the county of Fulton, State of Illinois, have invented certain new and useful Improvements in Clod-Crushers; and I do hereby declare the following to be a full, clear, and exact description of the invention, such as will enable others skilled in the art to which it appertains to make and use the same.

This invention relates to new and useful improvements in clod crushers for reducing or pulverizing the soil of hard irregular ground and in its broad conception it comprises a roller made in separable sections.

The primary object of the invention is to provide a clod crusher embodying a novel construction, combination and arrangement of parts, the details of which will appear in the course of the following description in which reference is had to the accompanying drawings forming a part of this specification, like characters of reference designating similar parts throughout the several views, wherein:—

Figure 1 is a top plan view of a clod crusher constructed in accordance with the present invention. Fig. 2 is a front end elevation thereof. Fig. 3 is a side elevation thereof. Fig. 4 is a transverse sectional view through the crushing cylinder, and Fig. 5 is a detailed perspective view of one of the bars of said cylinder, the other bars being similar in construction.

In the accompanying drawings the numeral 10 designates an open rectangular frame, which carries the forwardly projecting tongue 12 reinforced by braces 13, the seat post 14, carrying the driver's seat 15, being mounted upon the rear end of the tongue 12. The frame 10 is provided at its ends with depending bracket hangers 16 constructed as bearings for a transverse axle 18, the latter carrying at its ends wheels 19 provided in the inner side faces of their rims with square recesses 20 arranged in annular series to receive the reduced squared ends 21 of closely associated clod crushing bars 22. The bars 22 are of triangular shape in cross section and present their apices to the ground. Two annular series of such bars are employed, the bars of each series having their outer ends engaged in the recesses 20 of the respective wheels 19. The inner ends 21 of the bars 22 are engaged in squared recesses 23 formed in annular series in the side faces of a centrally located wheel 24. The members of each series of bars 22 are reinforced and connected by annular bands 25 secured to the inner circumferential faces of said bars by rivets 26. It will thus be seen that the bars 22 are detachable from the wheels 19 and 24 and that by adding or taking away wheels similar to the wheel 24, the width of the crusher may be increased or decreased as desired, in accordance with the circumstances of use. The intimate relation and the peculiar shape and arrangement of the bars 22 assures of the soil being thoroughly, uniformly and easily reduced.

What is claimed is:—

In a clod crusher, a crushing cylinder comprising end wheels, each having a rim provided with an annular series of squared recesses in its inner face, a wheel intermediate the end wheels and having a rim provided with annular series of squared recesses in opposite sides thereof, two annular series of crushing bars, each bar being of triangular shape in cross section and having opposite reduced extremities correspondingly shaped to the squared recesses and detachably fitted therein, and annular bands supporting the crusher bars between the end and intermediate wheels.

In testimony whereof, I affix my signature in presence of two witnesses.

ERNEST C. BANDLE.

Witnesses:
 OSCAR HORTON,
 E. J. HUGHES.